United States Patent
Dodd

(10) Patent No.: US 9,112,886 B2
(45) Date of Patent: Aug. 18, 2015

(54) METHOD AND SYSTEM FOR PROVIDING CENTRALIZED DATA FIELD ENCRYPTION, AND DISTRIBUTED STORAGE AND RETRIEVAL

(75) Inventor: Thomas Lance Dodd, Monument, CO (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1408 days.

(21) Appl. No.: 11/965,373

(22) Filed: Dec. 27, 2007

(65) Prior Publication Data
US 2010/0031023 A1    Feb. 4, 2010

(51) Int. Cl.
*H04L 9/28* (2006.01)
*H04L 9/06* (2006.01)
*H04L 29/08* (2006.01)
*H04L 29/06* (2006.01)

(52) U.S. Cl.
CPC ........ *H04L 67/1097* (2013.01); *H04L 63/0428* (2013.01); *H04L 63/0823* (2013.01); *H04L 63/166* (2013.01)

(58) Field of Classification Search
CPC ............ H04L 63/0428; H04L 63/0823; H04L 63/166; H04L 67/1097; H04L 67/1095; H04L 9/083; H04L 9/0891
USPC ......... 713/150–167; 714/4.11, 4.12; 707/673, 707/696–698, 711, 741–747; 380/44, 278
See application file for complete search history.

(56) References Cited

U.S. PATENT DOCUMENTS

| | | | | |
|---|---|---|---|---|
| 5,204,958 | A * | 4/1993 | Cheng et al. | 1/1 |
| 5,924,094 | A * | 7/1999 | Sutter | 1/1 |
| 6,029,247 | A * | 2/2000 | Ferguson | 726/5 |
| 6,185,695 | B1 * | 2/2001 | Murphy et al. | 714/4.11 |
| 6,438,705 | B1 * | 8/2002 | Chao et al. | 714/4.11 |
| 6,804,680 | B2 * | 10/2004 | Melli | 707/741 |
| 6,978,366 | B1 * | 12/2005 | Ignatchenko et al. | 713/166 |
| 7,054,872 | B1 * | 5/2006 | Das et al. | 707/741 |
| 7,260,841 | B2 * | 8/2007 | Tenereillo | 726/15 |
| 7,386,610 | B1 * | 6/2008 | Vekiarides | 709/224 |
| 7,636,840 | B2 * | 12/2009 | Tang | 713/150 |
| 7,809,674 | B2 * | 10/2010 | Chong et al. | 707/741 |
| 7,827,160 | B2 * | 11/2010 | Kuhr et al. | 707/705 |
| 7,864,952 | B2 * | 1/2011 | Pauker et al. | 380/28 |
| 7,865,499 | B2 * | 1/2011 | Schumacher | 707/711 |
| 7,921,085 | B2 * | 4/2011 | Guo et al. | 707/688 |
| 7,934,055 | B2 * | 4/2011 | Flynn et al. | 711/114 |
| 7,970,768 | B2 * | 6/2011 | Anderson et al. | 707/741 |
| 2003/0005282 | A1 * | 1/2003 | Bade | 713/151 |
| 2004/0010699 | A1 * | 1/2004 | Shao et al. | 713/189 |

(Continued)

*Primary Examiner* — Catherine Thiaw

(57) ABSTRACT

An approach is provided for securely storing sensitive data values. A primary facility is provided that directly or indirectly receives requests from a requestor to store an actual data value. The primary facility obtains a replacement value associated with the actual value and encrypts the actual value, and the replacement value is transmitted to the requestor. The replacement and encrypted values are stored in a master copy database at the primary facility, and copies thereof are stored in distributed secondary databases. When the requestor needs an actual data value, the requestor transmits the replacement value either to the primary facility for retrieval of data from the master database, or to the secondary facility for retrieval from the respective secondary database. The chosen facility retrieves the encrypted value from its respective database using the replacement value, decrypts the encrypted value, and transmits the actual value back to the requestor.

21 Claims, 17 Drawing Sheets

(56) References Cited

U.S. PATENT DOCUMENTS

| | | | |
|---|---|---|---|
| 2005/0283614 A1* | 12/2005 | Hardt | 713/182 |
| 2005/0289340 A1* | 12/2005 | Camenisch et al. | 713/165 |
| 2006/0005017 A1* | 1/2006 | Black et al. | 713/165 |
| 2006/0005048 A1* | 1/2006 | Osaki et al. | 713/193 |
| 2006/0075228 A1* | 4/2006 | Black et al. | 713/167 |
| 2006/0080486 A1* | 4/2006 | Yan | 710/123 |
| 2006/0212698 A1* | 9/2006 | Peckover | 713/151 |
| 2007/0055893 A1* | 3/2007 | Dodd | 713/193 |
| 2007/0261114 A1* | 11/2007 | Pomerantsev | 726/12 |
| 2008/0104709 A1* | 5/2008 | Averyt et al. | 726/27 |
| 2008/0141337 A1* | 6/2008 | Yeung et al. | 726/1 |
| 2008/0222267 A1* | 9/2008 | Horn | 709/217 |
| 2009/0132760 A1* | 5/2009 | Flynn et al. | 711/113 |
| 2009/0158030 A1* | 6/2009 | Rasti | 713/156 |
| 2010/0241844 A1* | 9/2010 | Hussain et al. | 713/150 |
| 2012/0278897 A1* | 11/2012 | Ang et al. | 726/26 |

* cited by examiner

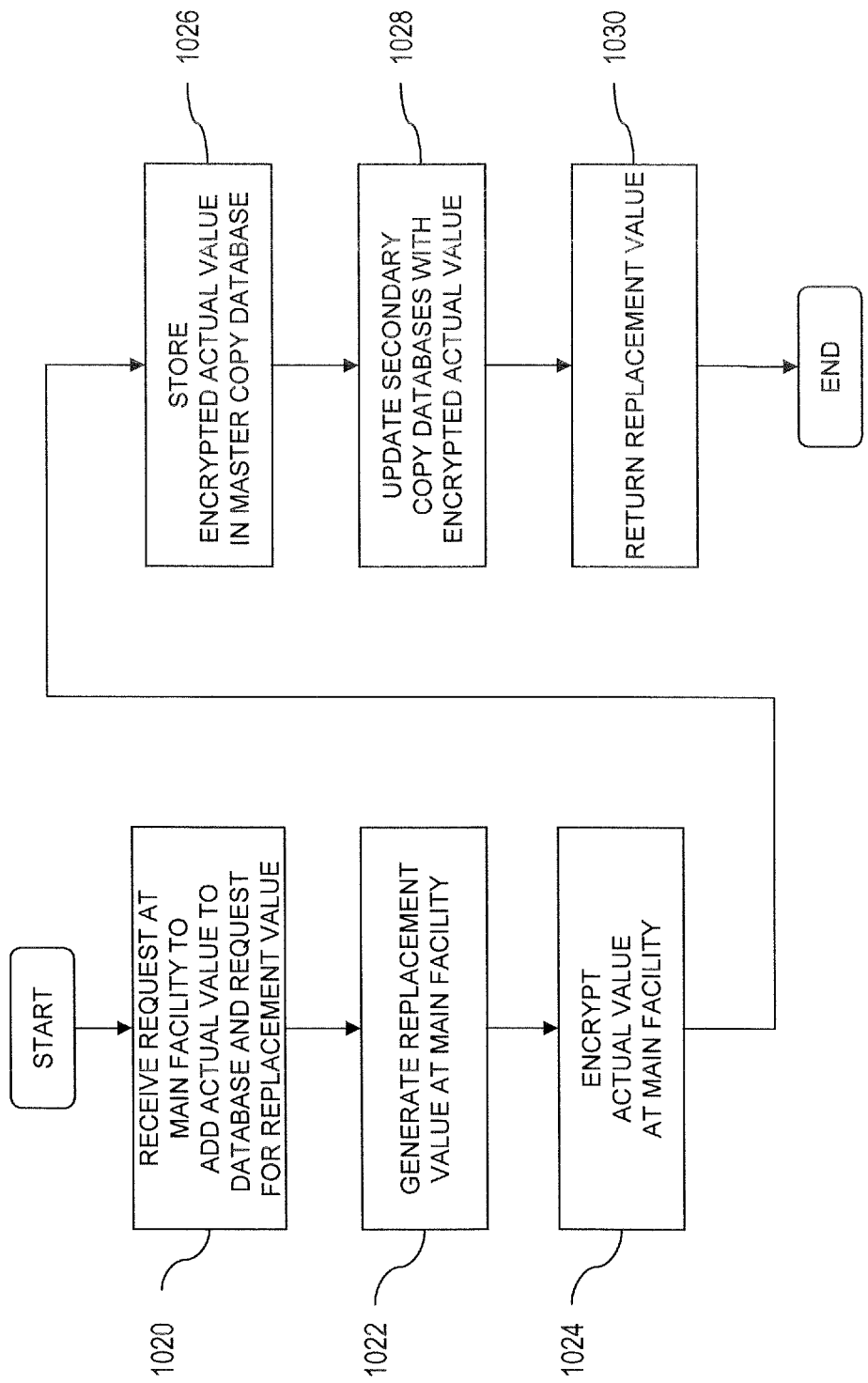

METHOD AND SYSTEM FOR PROVIDING CENTRALIZED DATA FIELD ENCRYPTION, AND DISTRIBUTED STORAGE AND RETRIEVAL

BACKGROUND INFORMATION

With the onset of public use of the Internet and the World Wide Web, secure handling of sensitive data has become a very important issue. Hackers have become very sophisticated in their techniques for accessing sensitive data stores. It has become more and more common for these hackers to steal and use for illegal purposes, such data stores, which can include private information such as social security numbers, driver's license numbers, calling card numbers, bank account numbers, and credit card numbers. Legislatures have responded to identity theft by enacting laws requiring businesses that store sensitive data to perform certain steps to ensure a particular level of integrity of the data. For example, a law may require a certain level of encryption or firewall protection, or the law may require that if data is compromised, a keeper of the data store so compromised may be required to inform all owners of the compromised data of the breach so that they may take appropriate steps such as informing credit bureaus to issue a fraud alert for their credit records, as well as monitoring their credit records for fraudulent activity.

A common method of storage of sensitive data involves encrypting the data and storing it in a database. Thus, data regarding a particular entity, such as a customer, is stored in common facilities. To access the data, a hacker need only figure out how to break in to the facility and how to decrypt the data, and the hacker would then have enough information to be able to make fraudulent use of the data. For example, if a hacker broke into a telecommunications client's database and managed to obtain a customer's identity and card number, the hacker might be able to fraudulently make thousands of dollars of calls using the information.

Therefore, there is a need for more secure storage of sensitive data.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 10a and 10b are flowcharts of, respectively, a process for requesting a replacement value from a central encryption service, and a process for generating the replacement value, in accordance with various exemplary embodiments;

DESCRIPTION OF THE PREFERRED EMBODIMENT

A preferred system, method, and software for a central encryption and storage manager are described. In the following description, for the purposes of explanation, numerous specific details are set forth in order to provide a thorough understanding of the ent invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
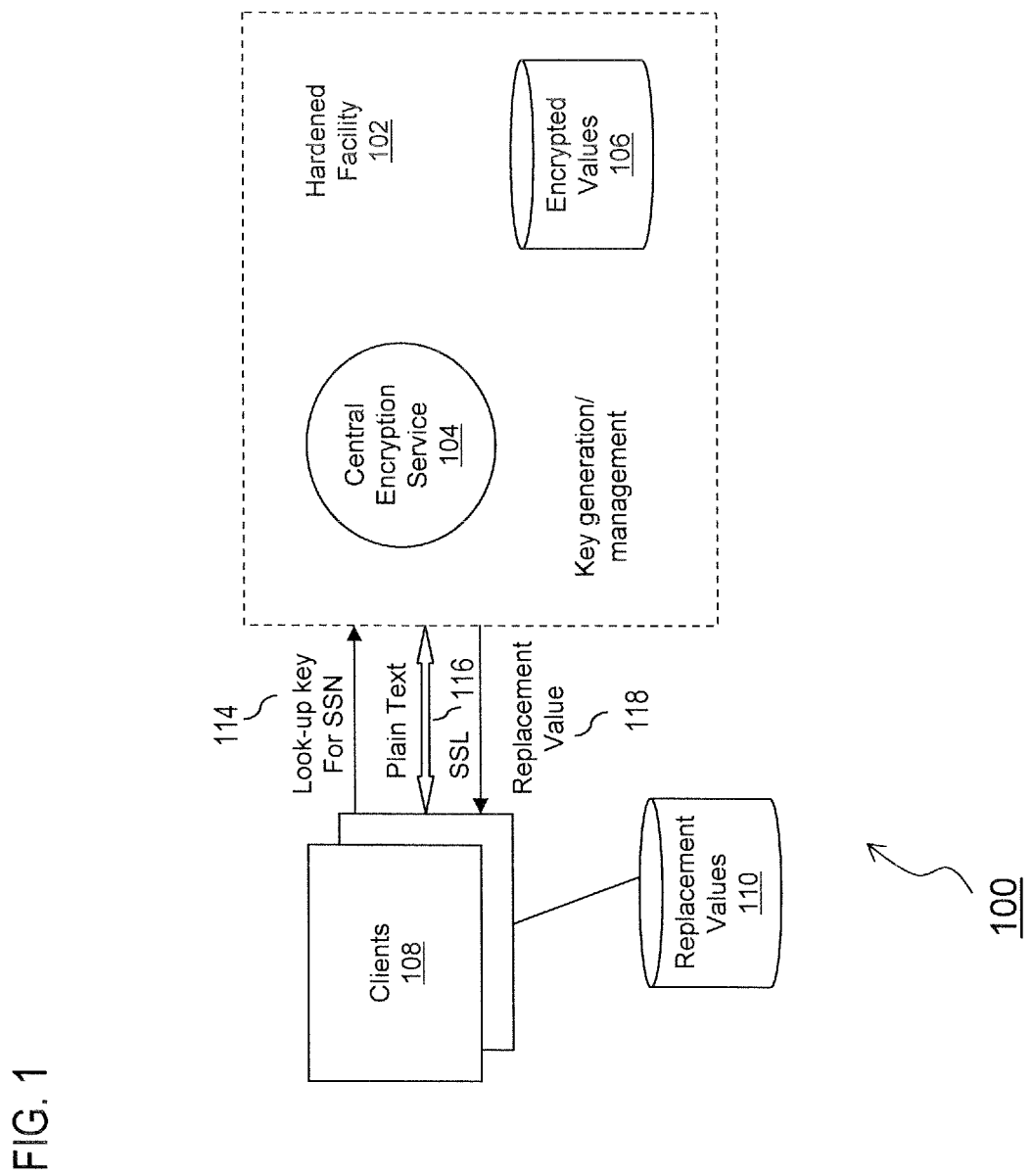
FIG. 1 depicts a networked system with an exemplary central encryption service for providing replacement values and storing actual values, according to an exemplary embodiment.

FIG. 1 depicts a networked system 100 with an exemplary central encryption service 104 for providing replacement values and storing actual values according to an exemplary embodiment. The depiction shown in FIG. 1 illustrates clients 108 or requestors requesting a replacement value 118 from the central encryption service 104 for an actual, sensitive data value, for example, by sending a look-up key value for a social security number (SSN) 114. The clients 108 may generally be any type of application, process, system, etc. that may need to store or process any type of sensitive data. Generally, the clients 108, or requestors, send a request 114 via a secure connection (e.g., Secure Sockets Layer (SSL)) 116 over a network to a separate hardened facility 102, which is responsible for generating and managing the replacement values and look-up key values, which may be used as an index for storing and retrieving the actual values. After verification of the requestor, the central encryption service 104 produces a replacement value 118 for the received actual data value and encrypts the received actual data value. The replacement value 118 may be generated as a data value having the same data attributes as the received actual data value; for example, a nine-digit social security number may be assigned a nine-digit numeric replacement value which "looks like" a social security number, but is a meaningless value to potential hackers. For example, if an actual value of a social security number is "978990123" then a replacement value of "943001234" may be obtained as a replacement value to be used as the look-up key value for the actual, sensitive value "978990123". The replacement value is merely used as a placeholder value for the client 108 or requestor to store and use to request the actual values by using the replacement value as a look-up key value. The clients 108 are generally separated from the hardened facility 102 such that the clients 108 may only retrieve an actual sensitive value by properly requesting the actual sensitive data value from the hardened facility 102 by providing the replacement value corresponding to the actual sensitive data value.

The replacement value 118 and the encrypted actual data value are then stored in an encrypted values storage 106. The two values may be stored as a replacement value 118 and encrypted value data pair that may be looked up by either of the two values. The replacement value 118 is then transmitted back to the clients 108, which may store the replacement value in a replacement values storage 110. The clients 108 may request replacement values for any number of different sensitive data fields such as: social security numbers, calling card numbers, bank account numbers, credit card numbers, driver license numbers, employee numbers, student account numbers, etc. One skilled in the art would recognize that sensitive data fields may include any type of data, such as numeric, alphabetic, special characters, etc. Each different sensitive data field, or portion thereof, for a particular customer may be assigned a different replacement value, thus adding complexity to the task of a hacker trying to compromise a customer's sensitive information. The encrypted actual data values are stored separately in the central hardened facility 102 in separate logical encrypted values storage 106, and thus even if a hacker accesses the hardened facility's media 106, they would only get meaningless data. One skilled in the art would recognize that these values may be stored in other ways than those described herein without deviating from the spirit or scope of the present invention. For example, instead of actually storing the replacement value 118 in the encrypted values storage 106, the replacement value may instead be used as an index, or look-up key value to store and retrieve the corresponding data value. Another indicator of an association, or correspondence between the actual data value and the replacement value, for example, may be stored in lieu of storing the pairs of values as well.

When the clients 108 need the actual data, for example, for billing, statistics, or other types of reporting, the clients 108 simply access the replacement value 118 from the replacement values storage 110 located at the clients' facilities and send the replacement value 118 with a request to the hardened facility 102, where the requestor is authenticated. The replacement value 118 is then used to look up the actual data value in the encrypted values storage 106, the retrieved encrypted value is decrypted, and then sent back via a secure connection to the requestor. The clients 108, thus advantageously, have no need to store actual sensitive data values at the clients' facilities. A hacker accessing the replacement values storage 110 would only retrieve data values that are meaningless to all but the hardened facility 102, which is a centralized repository physically and logically separated from the clients 108.

Figure 2:
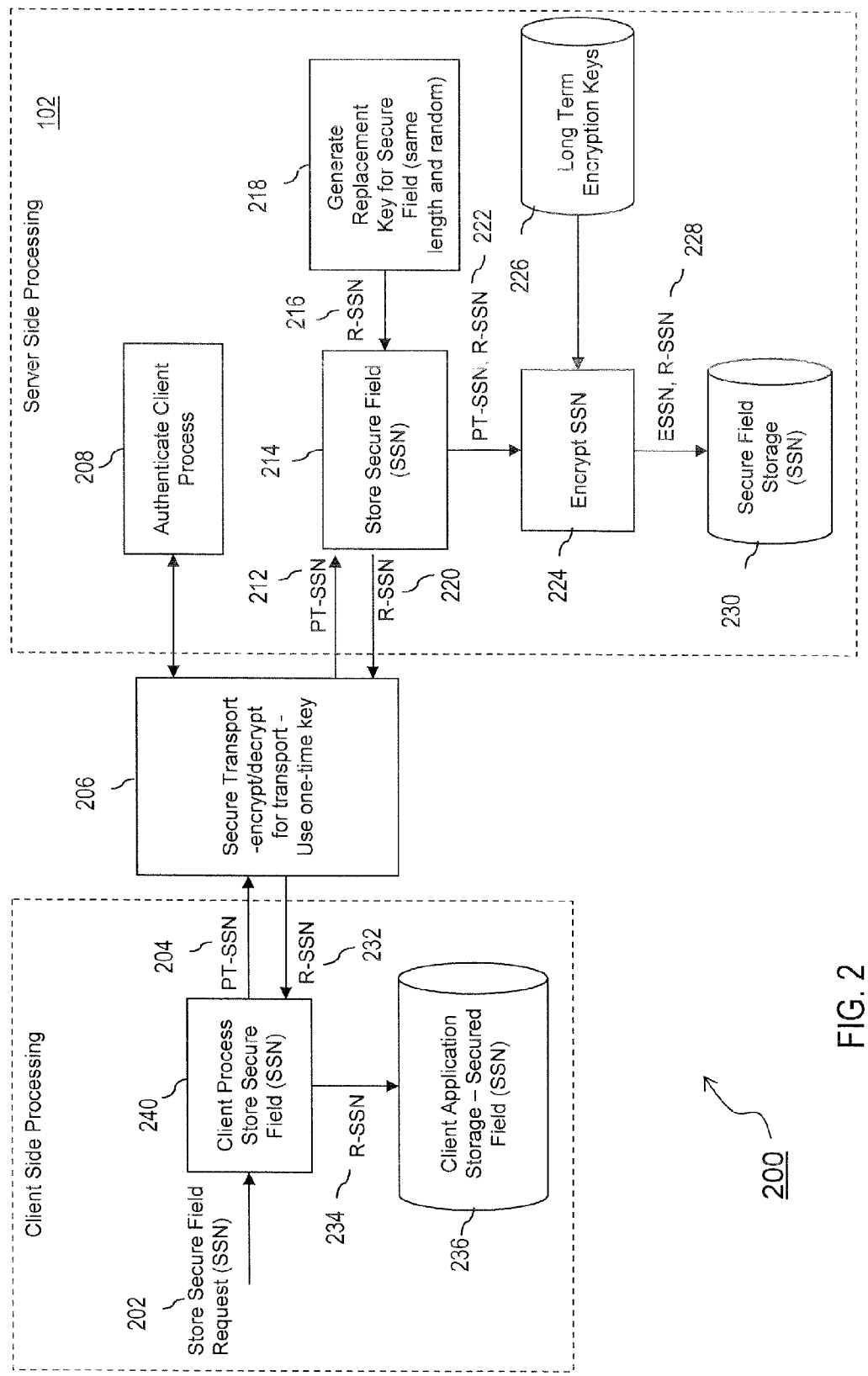
FIG. 2 depicts a networked system with an exemplary central encryption service for generating replacement values and storing encrypted actual data values for an exemplary requestor such as a client, in accordance with an exemplary embodiment.
Figure 3A:
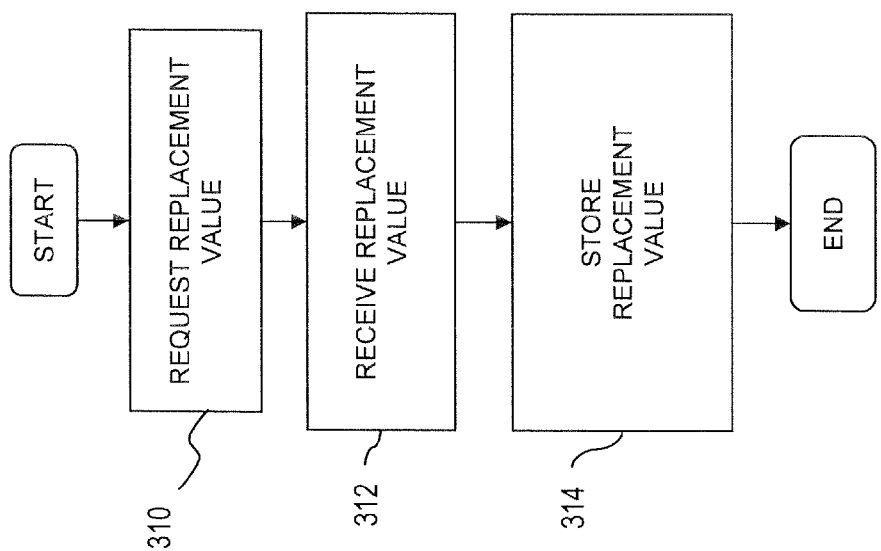
FIGS. 3a and 3b are flowcharts, respectively, of a process for requesting a replacement value from a central encryption service, and a process for generating the replacement value, in accordance with various exemplary embodiments.
Figure 3B:
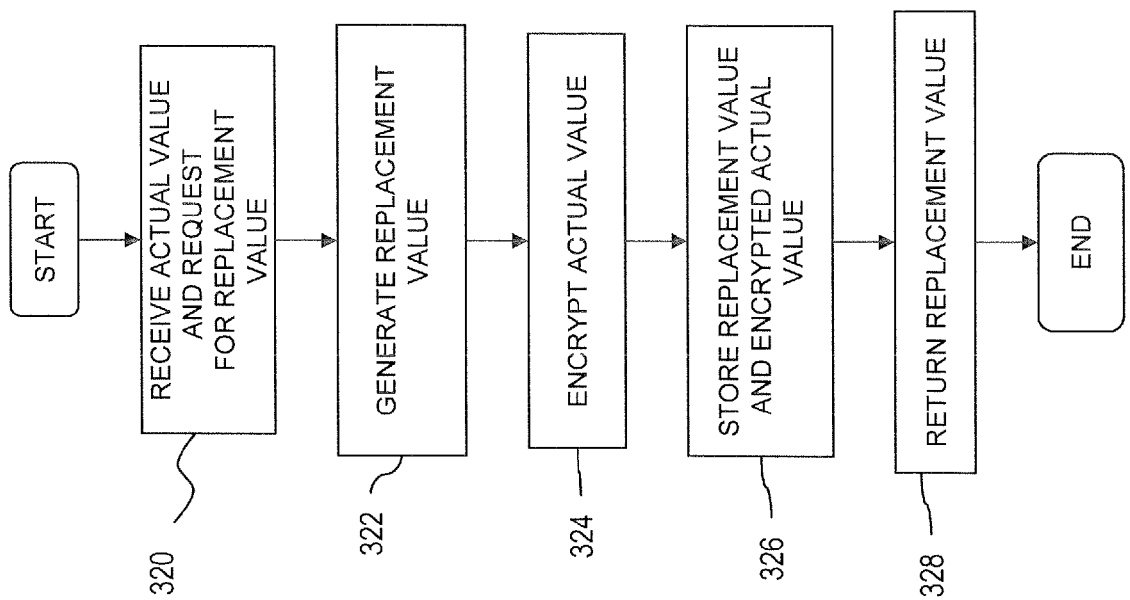

FIG. 2 depicts a networked system 200 supporting an exemplary central encryption service 104 for generating replacement values 118 and storing encrypted actual data values for an exemplary client 108. FIG. 3a is a flowchart depicting exemplary steps that may be performed by the exemplary client 108 requesting a replacement value from an exemplary central encryption service 104, while FIG. 3b is a flowchart depicting exemplary steps that may be performed by the exemplary central encryption service 104 providing the replacement value to the exemplary client 108 in accordance with an exemplary embodiment. The exemplary networked system 200 depicts the client 108 requesting secure storage 202 for a social security number (SSN) as a sensitive data value, although it is understood that any type of sensitive data may receive similar treatment using the concepts described herein. (Step 310) The client 108 generates a store secure field request (SSN) 202 which is received by a client process store secure field 240. The client process store secure field 240 sends a request with a plain text format of the SSN (PT-SSN) 204 for secure transport via a secure transport 206, which may transport the information via, for example, a SSL transport to the hardened facility 102. The hardened facility 102 receives the request and then authenticates the requestor, for example, the hardened facility 102 authenticates 208 the client process which sent the data. (Step 320) If the requestor is not authenticated, the hardened facility 102 may respond to the request with an "access denied" response.

If the requestor is authenticated, then the central encryption service 104 receives the PT-SSN 212 to process the PT-SSN 212 via a store secure field 214 process. A replacement SSN (R-SSN) 216 is received from a generate replacement key for secure field 218 process. (Step 322) The replacement key value may be generated by a random number generator as a value having the same length and data type as the original actual data value (e.g., numeric, nine digit value for SSN), and may be unique for each actual data value. It is preferable that the replacement key value be unique for each actual data value. One skilled in the art of data processing would recognize that there are many ways to obtain or generate the replacement key values such that they have a relationship with the PT-SSN 212 that is not easily ascertainable to a potential hacker, without departing from the spirit and scope of the present invention. Further, the replacement key values may be generated in advance of the receipt of a request, or they may be generated upon request. The PT-SSN 212 and the R-SSN 222 are then received by encrypt SSN 224, which encrypts the PT-SSN 212 using an encryption technique of choice used by the hardened facility 102, by using long term encryption keys 226 maintained by the hardened facility 102. (Step 324) Advanced Encryption Standard (AES) may be used as an exemplary encryption technique. The encrypted SSN (ESSN) and the replacement SSN, as an ESSN, R-SSN pair 228, are then stored in a secure field storage 230 under the control of the hardened facility 102. (Step 326) The R-SSN is then sent as R-SSN 220 to the secure transport 206 (Step 328) for secure transport to the client process store secure field 240 via a securely transported R-SSN 232, (Step 312) for replacement of the original actual data value, and for storage as R-SSN 234 in a client application storage 236. (Step 314) The R-SSN stored by the client may then be used to request the actual data value from the hardened facility 102 when needed.

Figure 4:
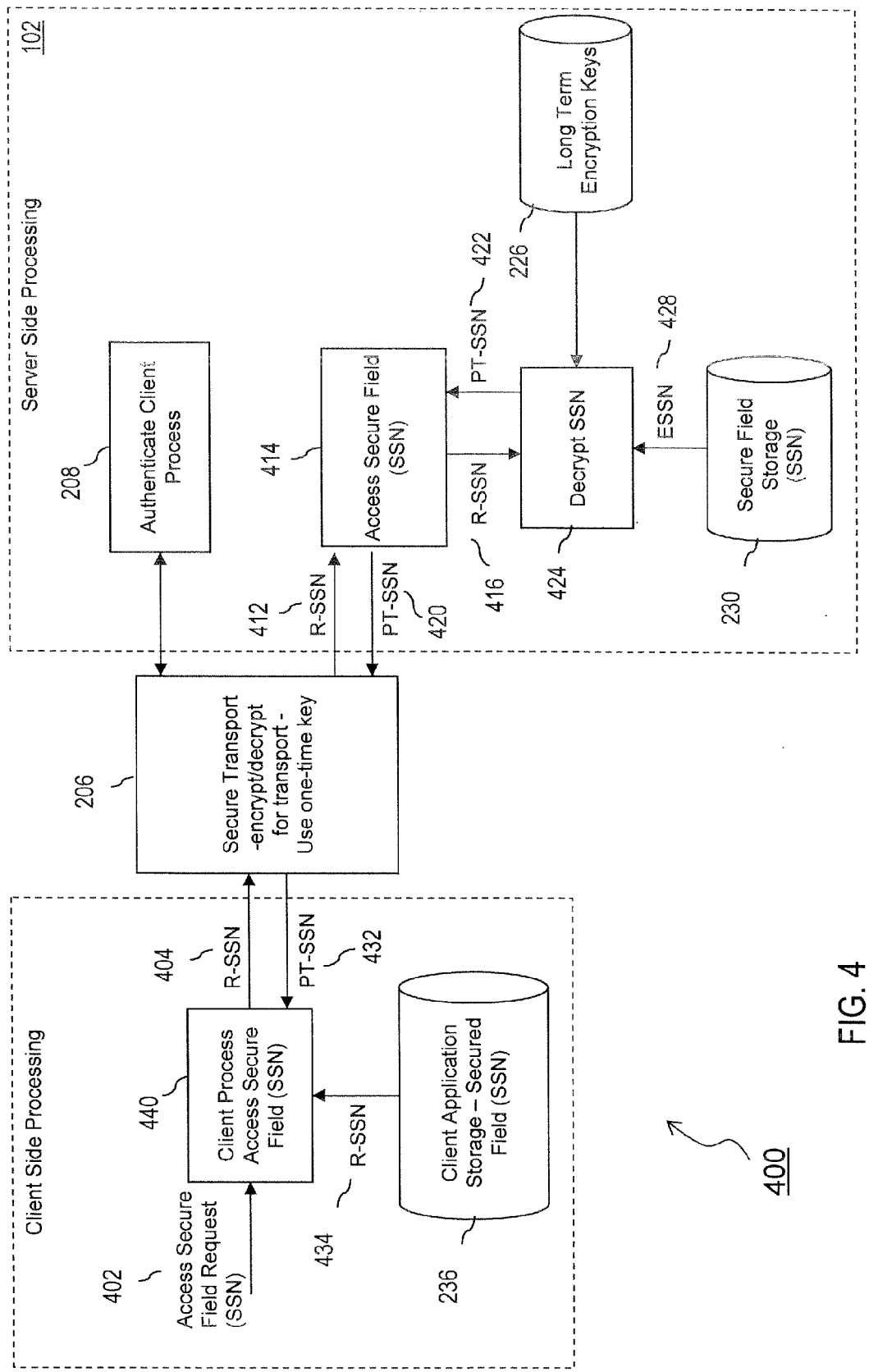
FIG. 4 depicts a networked system with an exemplary central encryption service for retrieving stored actual values, according to an exemplary embodiment.
Figure 5A:
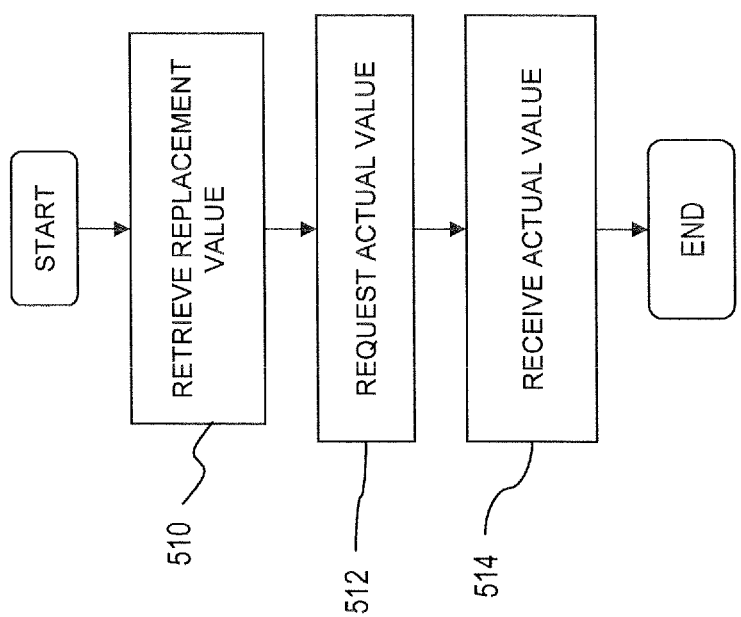
FIGS. 5a and 5b are flowcharts of, respectively, a process for requesting an actual value from a central encryption service, and a process for generating the actual value, in accordance with various exemplary embodiments.
Figure 5B:
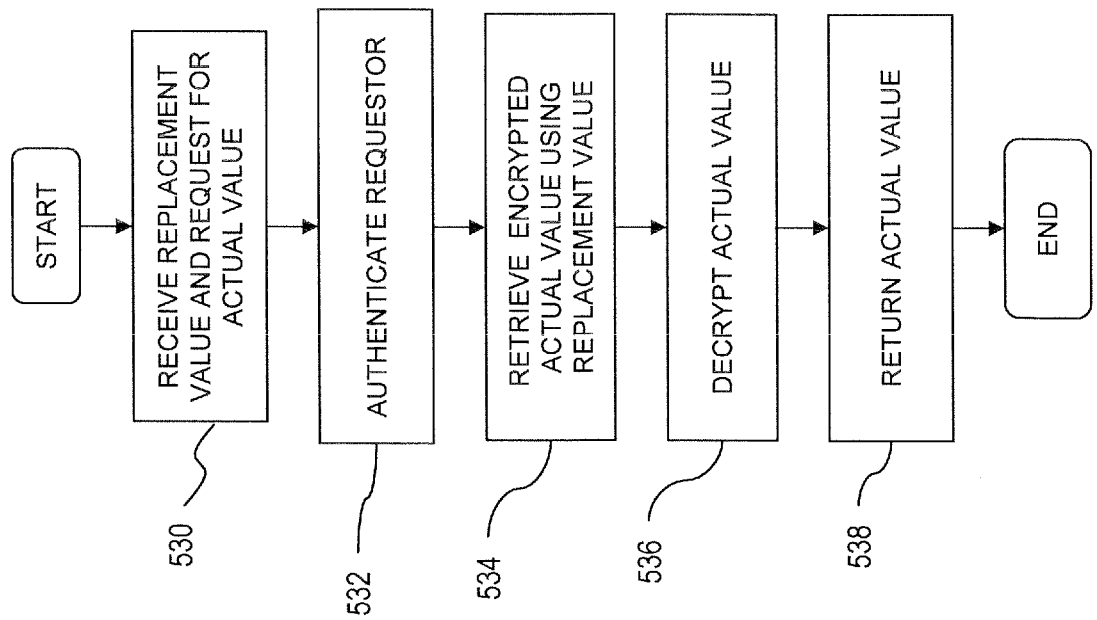

FIG. 4 depicts a networked system with an exemplary central encryption service 104 for retrieving stored actual values for an exemplary client 108. Meanwhile, FIG. 5a is a flowchart depicting exemplary steps that may be performed by the exemplary client 108 requesting an actual value from the exemplary central encryption service 104, and FIG. 5b is a flowchart depicting exemplary steps that may be performed by the exemplary central encryption service 104 providing the requested actual value to the exemplary client 108 according to an exemplary embodiment. The exemplary networked system 400 depicts the client 108 requesting access 402 to a securely stored actual data value, for example, a social security number (SSN), although it is understood that any type of sensitive data may receive similar treatment using the concepts described herein. A client process access secure field 440 requests and receives a replacement value, for example, R-SSN 434 from the client application storage 236. (Step 510). The client process access secure field 440 then sends a request for the securely stored actual data value, with a plain text format of the R-SSN 404, for secure transport via the secure transport 206, which may transport the information via, for example, a SSL transport to the hardened facility 102. (Step 512) The hardened facility 102 receives the request (Step 530) and then authenticates the requestor, for example, the hardened facility 102 authenticates 208 the client process which sent the request. (Step 532) If the requestor is not authenticated, the hardened facility 102 may respond to the request with an "access denied" response.

If the requestor is authenticated, then the central encryption service 104 receives the R-SSN 412 to process the plain text R-SSN 412 via an access secure field 414 process. The R-SSN 416 is then received by decrypt SSN 424, which retrieves the ESSN 428, from the secure field storage 230, for example, by using the R-SSN 416 as a look-up value. (Step 534) The decrypt SSN 424 decrypts the ESSN 428 using a decryption technique of choice used by the hardened facility 102, by using long term encryption keys 226 maintained by the hardened facility 102 which were used to encrypt the ESSN. (Step 536) The decrypted actual value of the SSN is then sent as a PT-SSN 422 to the access secure field 414. The access secure field 414 then forwards the PT-SSN 420 to the secure transport 206 (Step 538) for secure transport to the client process access secure field 440 via a securely transported PT-SSN 432, (Step 514) for use by the requestor via client 108.

This technique advantageously avoids any need for the clients 108 to store sensitive data in their own storage facilities, thus relieving the clients from the tasks of determining how to encrypt and store their sensitive data as hackers become more and more sophisticated, and as laws are passed requiring more and more security.

Figure 6:
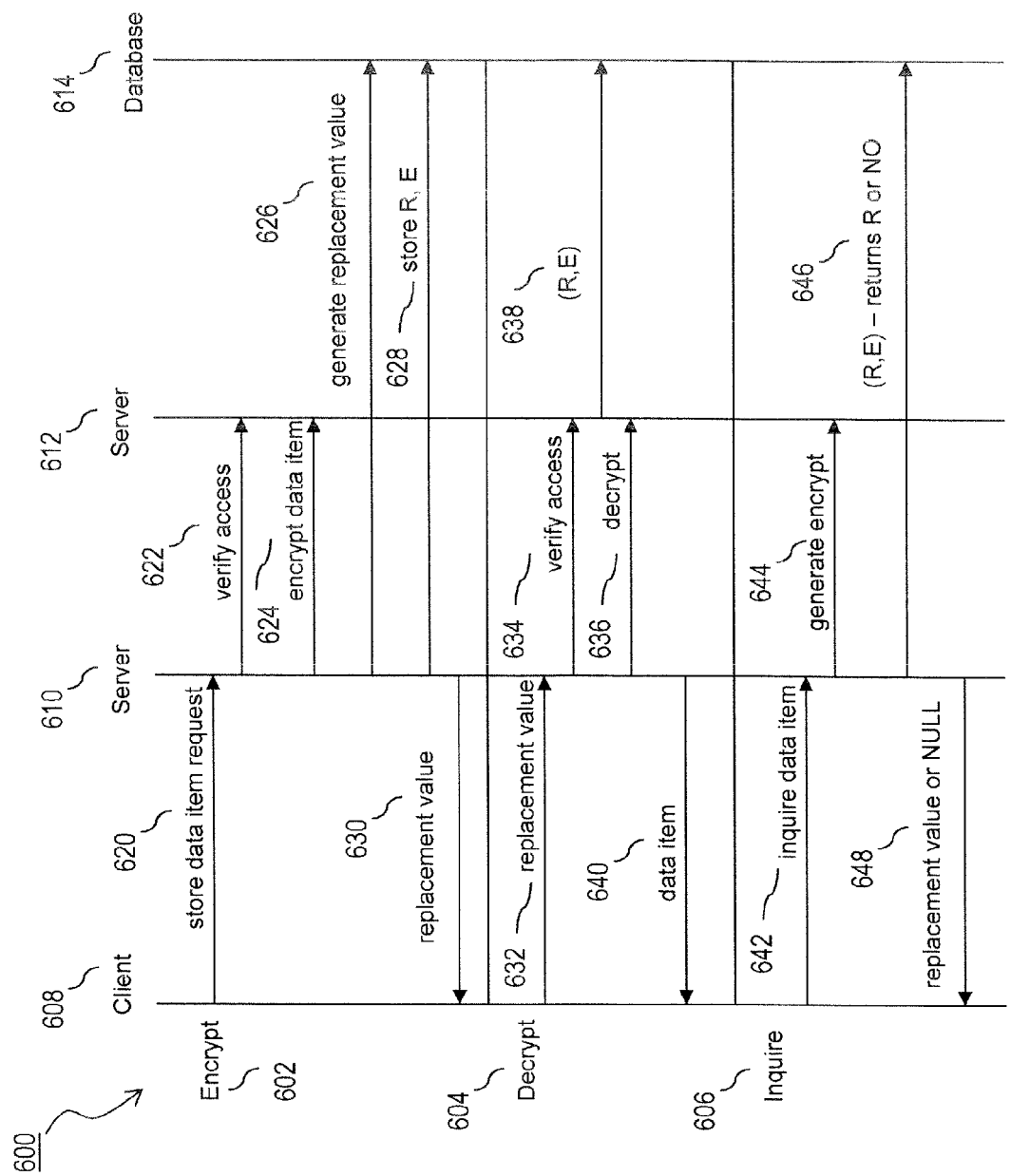
FIG. 6 depicts an exemplary system flow diagram illustrating data flow between an exemplary client and an exemplary central encryption service in accordance with an exemplary embodiment.

FIG. 6 depicts an exemplary system flow diagram 600 illustrating a data flow between an exemplary client 608 or requestor and an exemplary central encryption service 104 in accordance with an exemplary embodiment. The exemplary system flow diagram 600 illustrates flows of data for each of three client application program interfaces (APIs) for encrypt 602, decrypt 604, and inquire 606. Each of these APIs may be supported, for example, by extensible markup language (XML) implementations. Further, a connect API may be used to connect the client application to the security infrastructure to validate roles and access levels of the requestor client 608. A disconnect API may also be utilized to disconnect the client 608.

For the purposes of explanation, the dataflow of the exemplary encrypt API 602 is explained with respect to the system of FIG. 2. In accordance with the exemplary encrypt API 602, the client 608 sends a request 620 to store a data item to a server 610, via the client process store secure field 240, which may send a request with a plain text format of the data item such as the PT-SSN 204. Once a secure connection, for example, an SSL connection via the secure transport 206, is established and a connect API returns success, the encrypt API 602 can be called. In step 622, the server 610 then verifies access rights of the requestor via a server 612, for example, via the authenticate client process 208, and in step 624 requests encryption of the data item, for example, via the encrypt SSN 224. The server 612 receives a generated replacement value 626 for the data item, and in step 628 stores the replacement value and the encrypted data value as a data pair R,E, for example, ESSN, R-SSN 228, in a database 614 such as secure field storage 230, which is under the control of the central encryption service 104. In step 630, the replacement value such as R-SSN 220 is then returned to the client 608 via the secure transport 206 and the client process store secure field 240 for storage in the client's storage media 236. When the client needs the actual value, for example, for viewing, billing or reporting, the decrypt API 604 may be called to retrieve the actual data value from the database 614.

For the purposes of explanation, the dataflow of the exemplary decrypt API 604 and the exemplary inquire API 606 are explained with respect to the system of FIG. 4. In accordance with the exemplary decrypt API 604, the client 608 sends a request 632 to retrieve a data item to the server 610 by sending the replacement value of the data item with the request 632, for example, via the client process access secure field 440, which may send a request with a plain text format of the replacement value associated with the data item such as the R-SSN 404. Once a secure connection, for example, an SSL connection via the secure transport 206, is established and a connect API returns success, the decrypt API 604 can be called. In step 634, the server 610 then verifies access rights of the requestor via the server 612, via the authenticate client process 208, and in step 636 requests decryption of the data item that is associated with the received replacement value such as R-SSN 412, for example, via the decrypt SSN 424. In step 638, the server 612 retrieves the encrypted data value, for example, the ESSN 428 from the database 614 such as the secure field storage 230 using the replacement value, for example, the R-SSN 416 for the data item. The encrypted data value is then decrypted and in step 640 the decrypted value, for example, PT-SSN 420 is then returned to the client 608, via the secure transport 206 and the client access secure field 440, for use by the client 608.

In accordance with the exemplary inquire API 606, the client 606 sends a request 642 to the server 610 to inquire about the existence in the database 614 of a particular data item by sending the value of the data item with the request 642, via a client process which may send a request with a plain text format of the data item such as the PT-SSN 204. In step 644, the server 610, in conjunction with server 612, generates an encrypted version of the data item, for example, via the encrypt SSN 224 and the long term encryption keys 226. Additionally, in step 646, the server 610 searches the database 614 such as the secure field storage 230 for the encrypted data value. The search returns a value of a replacement value for the encrypted data value if the data item is stored in the database 614, or a value indicating that the encrypted value was not found, for example, a value of NULL. In step 648, the replacement value or NULL is then returned to the client 608.

Figure 7:
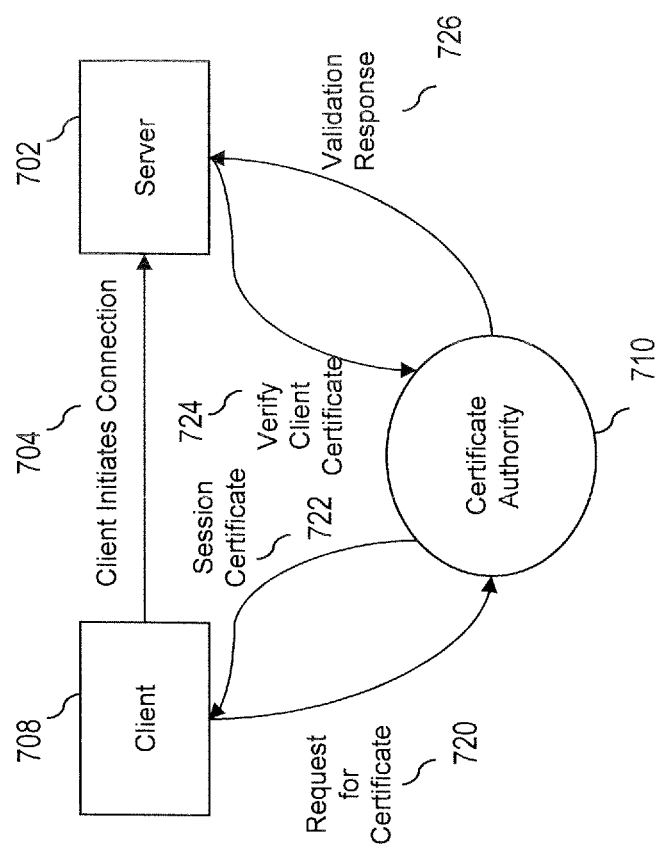
FIG. 7 depicts an exemplary system flow diagram illustrating data flow between an exemplary client and an exemplary server service providing secure communication in accordance with an exemplary embodiment.

FIG. 7 depicts an exemplary system flow diagram illustrating data flow between an exemplary client 708 and an exemplary server service 702 providing secure communication in accordance with an exemplary embodiment. Data transferred between the client 708 and the server service 702 is preferably encrypted for transport, for example, by use of secure transport services such as SSL. It may also utilize server side authentication of client processes with legitimate need to store or retrieve select critical fields (e.g., SSN, driver license number, card numbers, etc). The client may also authenticate the server via certification, for example, to ensure that the client is connected to a valid server.

SSL involves the use of strong encryption of all transmitted data using a combination of publicly held keys to encrypt the data and privately held keys which are used by the receiving system to decrypt the data. These keys are exchanged via a trusted sourced which is known as a certificate server. Through a trusted relationship that is established between the client, server, and the certificate server, the client and server can be assured that each entity is the actual entity indicated by a particular transmission, and that the data stream will maintain a high level of privacy and integrity.

The exemplary technique described herein may, for example, be used to authenticate a requestor of data from the hardened facility 102 as described above, for example, with regard to the authenticate client process 208. A client 708 sends a request for a certificate 720 to a trusted certificate authority 710, which returns a session certificate 722 to the client 708. As the client initiates the connection 704, the underlying mechanics of SSL may obtain a digital certificate in order to successfully establish a communications pipe. This certificate is obtained from a certificate authority site 710, which is a trusted third party server. The digital certificates are electronic files that are used to identify people and resources over networks such as the Internet. Digital certificates also enable secure, confidential communication between two parties using encryption. The certificate performs two functions: 1) it identifies a client (individual or application) as a trusted known entity; and 2) it provides the client with the certificate which will be used to exchange information with the server.

Once the digital certificate is obtained, the SSL protocol uses it to create a secure, confidential communications "pipe" between two entities. Data transmitted over an SSL connection cannot be tampered with or forged without the two parties becoming immediately aware of the tampering. Digital certificates are based on public-key cryptography, which uses a pair of keys for encryption and decryption. With public-key cryptography, keys work in pairs of matched "public" and "private" keys. The public key is used by the client to encrypt the data passed to the server. Only the server knows how to decrypt the message using its private key. When it is time for the server to respond, it uses the client's public key to encrypt the reply. Only the client will be able to decrypt this message using its own privately held key.

The client initiates 704 a connection with the server 702. In order to authenticate the requestor client 708, the server 702 sends a request 724 to verify the client certificate. The trusted certificate authority 710 then sends a validation response 726 to the server 702 after determining the validity of the client request to the server 702. While this discussion focuses on an exemplary use of SSL, one skilled in the art of data processing will understand that any secure transport technique may be used without departing from the spirit and scope of the present invention.

Figure 8:
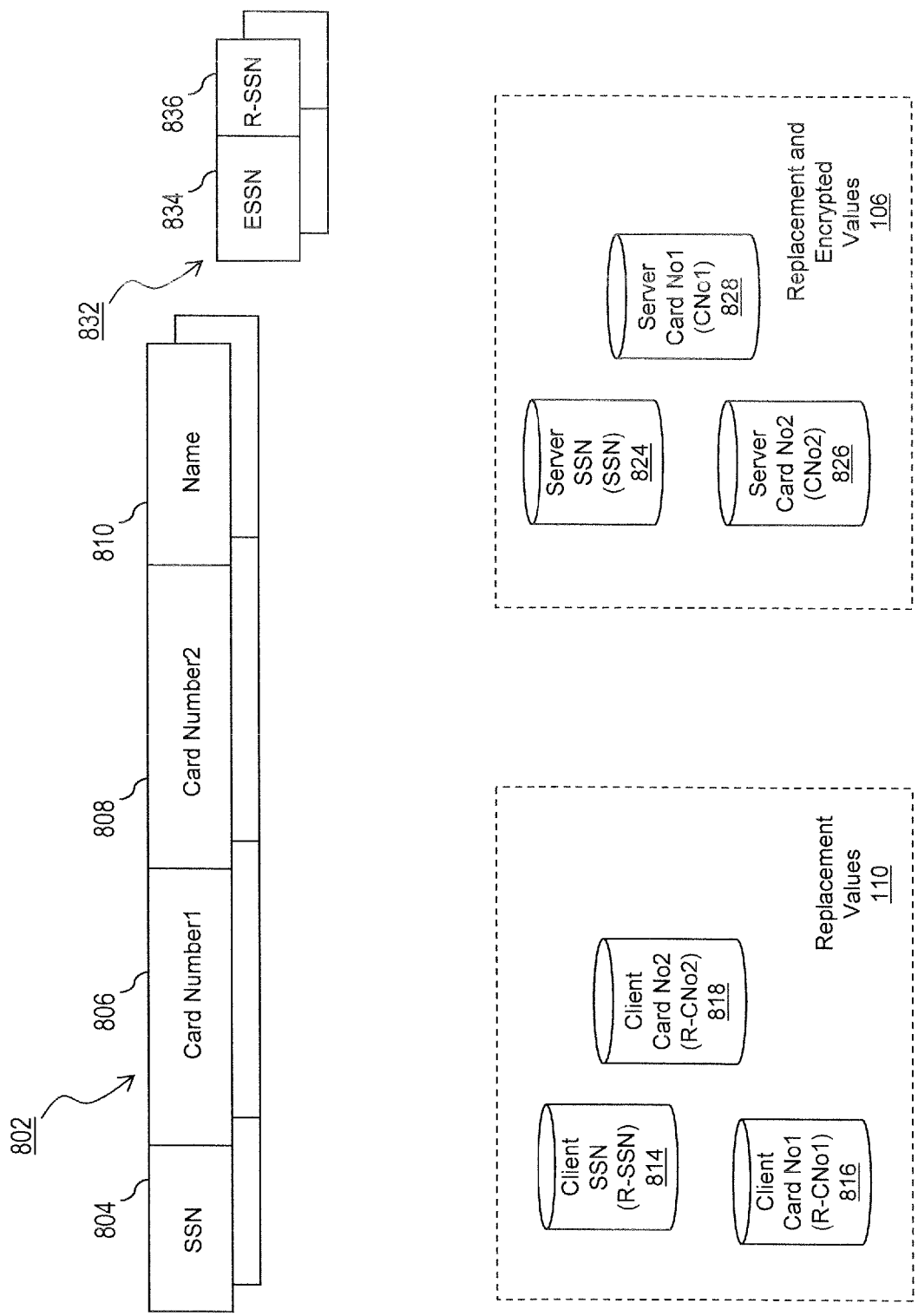
FIG. 8 depicts an exemplary customer record for an exemplary client system and exemplary storage for the client system and an exemplary central encryption service in accordance with an exemplary embodiment.

FIG. 8 depicts an exemplary customer record 802 for an exemplary client system. FIG. 8 also depicts an exemplary value pair 832 comprising encrypted value (ESSN) 834 and replacement value (R-SSN) 836 for an exemplary central encryption service. Further, FIG. 8 depicts exemplary storage for replacement values storage 110 for the client system and for encrypted values storage 106 for the exemplary central encryption service in accordance with an exemplary embodiment. The value pair 832 depicts, specifically for an exemplary social security number (SSN) field, a logical view of the data managed by the central encryption service. For example, the central encryption service may store an indicator of the association or relationship between the encrypted value 834 and the replacement value 836 in the encrypted values storage 106. The replacement value 836 may be used as an index to store or retrieve the encrypted value 834, or the pair may be stored as a data pair. One skilled in the art will recognize that there are many different ways, additional to those enumerated herein, for storing such an indicator without departing from the spirit or scope of the present invention.

The customer record 802 depicts a logical view of a customer's information including a social security number (SSN) 804, a "card number1" 806, a "card number2" 808, and a customer name 810. The SSN field is typically a nine digit numeric field, and card numbers may be any length and any data type; for example, a calling card number may be ten digits, a credit card number may be sixteen digits, and a driver license number may be any length and include any combination of digits, letters, or other characters.

The actual data from sensitive data fields may be stripped from the logical customer record 802 such that, for example, the actual SSN value 804 may be encrypted and stored in the encrypted values storage 106 for "server SSN" 824 storage for the exemplary central encryption service. Only the replacement value for the SSN value 804 is stored in the replacement values storage 110, in a "client SSN" 814 storage medium on the client side. Similarly, the actual "card number1" value 806 and the "card number2" value 808 may be separately encrypted and stored in respective storage media "server card no1" 828 and "server card no2" 826, with the respective replacement values for these fields stored respectively in "client card no1" storage 816 and "client card no2" storage 818. Information regarding multiple data fields may be sent in one transmission between the clients 108 and the hardened facility 102.

An advantage of separating out the various fields of the logical customer record 802 lies in the difficulty posed to a potential hacker in his/her attempt to decipher meaning out of the data stored in the client's storage media and the data stored in the server's storage media. To one not privy to the exact technique used to produce the replacement values, each of the separate storage media of the client merely contain meaningless strings of data that are only useful in requesting a lookup from the server. Furthermore, the encrypted data stored in the separate storage media 824, 826, and 828 on the server side, while each contains encrypted sensitive data, none of the data is theoretically useful to a hacker, as, for example, a social security number, driver license number, or card number is potentially useless without further information, such as a corresponding name.

An advantage of separating the encryption from the client to the central encryption service 104 is that the clients 108 do not have to worry about keeping up with the technology of encrypted storage or key management. The central encryption service 104 may keep track of its own encryption keys used for encrypting the stored actual data values, and may periodically decrypt and re-encrypt the stored values periodically, for example, as stronger encryption is deemed desirable, with the encryption process completely unknown and invisible to the clients 108. As long as client systems do not store the actual data values in any type of temporary files or other long-term storage, the actual values are very secure. The client systems may communicate replacement values for data fields among other client systems, such that the actual values will only be accessed from the hardened facility when needed.

Further, different data fields may need varying levels of access security. For example, a supervisor may need access to employee numbers of his/her working group, but may not need access to the driver license numbers of those employees, while a human resources administrator may need access to the driver license numbers of the employees. All of these considerations may be included in the client applications and the applications of the central encryption service to enable appropriate access only to those who are entitled.

The system described herein may easily support redundancy, high efficiency, and operational reliability with hardened security. Batch and/or online interfaces may be utilized. The system described herein is easily extended to track use scenarios, for example, use statistics and audits.

Figure 9:
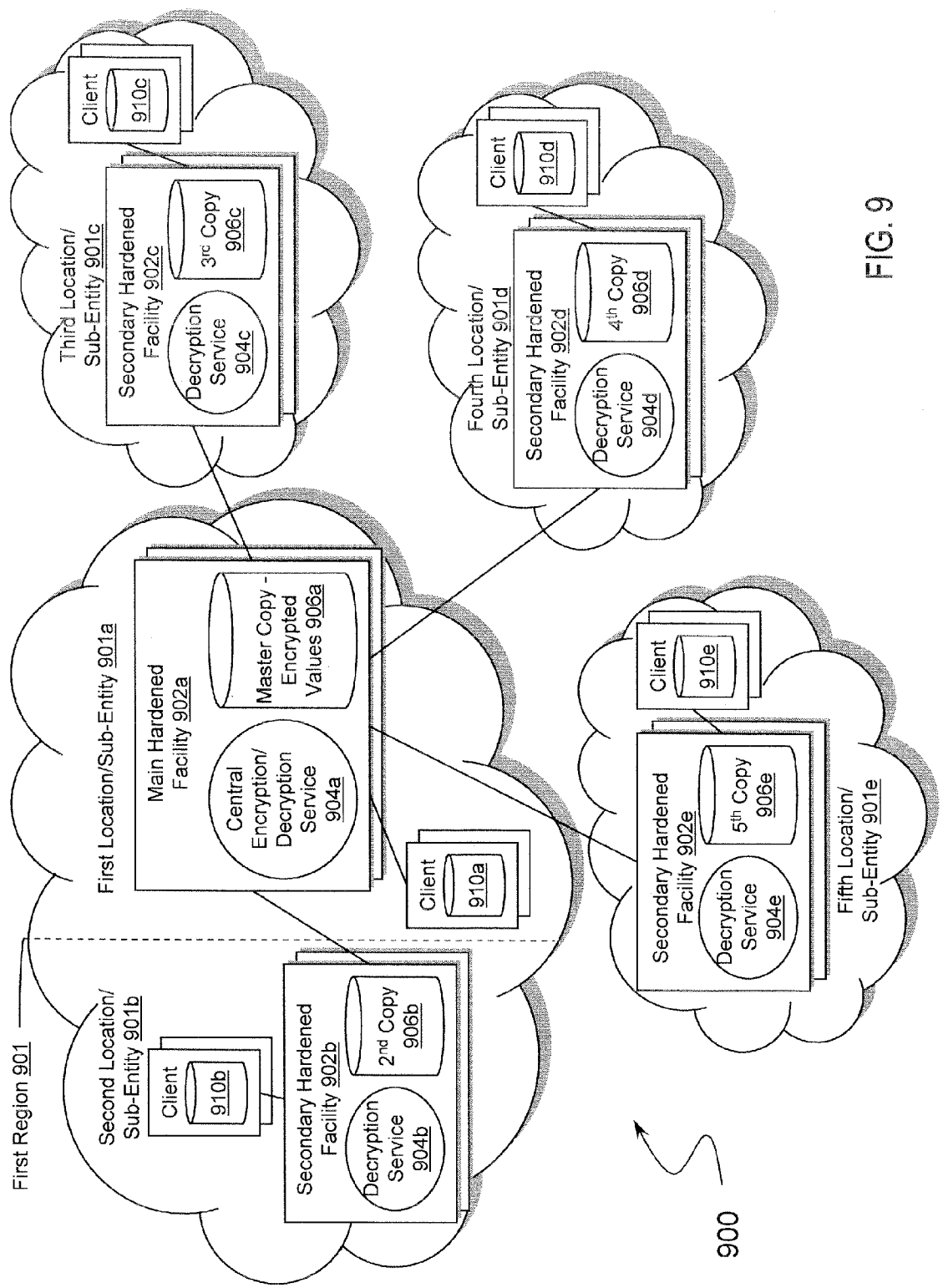
FIG. 9 depicts a distributed networked system with an exemplary central encryption service for providing replacement values and storing actual values, and multiple secondary decryption and distribution services according to an exemplary embodiment.

FIG. 9 depicts a distributed networked system 900 with an exemplary central encryption service 904a for providing replacement values and storing actual values, and multiple secondary decryption and distribution services 904b, 904c, 904d, and 904e according to an exemplary embodiment. The distributed network system 900 is advantageous in situations where the application is receiving a large volume or number of data retrieval requests and a low volume of number of data storage requests. In the distributed networked system 900, a master copy 906a of data being stored (e.g. encrypted values, etc.) is located at a main hardened facility 902a at a first location and/or corporate sub-entity 901a, and one or more secondary copies (e.g., 906b, 906c, 906d, and 906e) of the master copy are stored at secondary geographic locations and/or corporate sub-entities (e.g., 901b (which happens to be in a same geographic region 901 as the first location and/or corporate entity 901a in this embodiment), 901c, 901d, and 901e). Thus, in the distributed network system 900, for a given application, a central encryption/decryption service 904a processes all data storage requests (e.g. by providing replacement values to the requestor and storing the actual values in the master copy 906a) from clients (e.g., 910a, 910b, 910c, 910d, and 910e) and all data retrieval requests from clients are processed by the client's respective local decryption service (e.g., 904a, 904b, 904c, 904d, or 904e) and the data stored at that location (e.g., master copy 906a; or secondary copies 906b, 906c, 906d, or 906e).

The depiction shown in FIG. 9 illustrates clients 910a, 910b, 910c, 910d, and 910e or requestors requesting a replacement value from the central encryption service 904a for an actual, sensitive data value. In the case of clients 910b, 910c, 910d, and 910e, the request can be made to their respective local secondary hardened facility 902b, 902c, 902d, and 902e, respectively, and that local secondary hardened facility then forwards the request to the main hardened facility 902a for that application for processing. The clients may generally be any type of application, process, system, etc. that may need to store or process any type of sensitive data. Generally, the clients, or requestors, send a request via a secure connection (e.g., Secure Sockets Layer (SSL)) to their respective hardened facility, and each of the secondary hardened facilities have a secure connection (e.g., SSL) to the main hardened facility. The main hardened facility 902a processes requests in the same general manner as the hardened facility 92 previous described with respect to FIGS. 1 and 2.

After verification of the requestor, the central encryption service 904a produces a replacement value for the received actual data value and encrypts the received actual data value. The replacement value and the encrypted actual data value are then stored in a master copy of encrypted values storage 906a. Once the master copy 906a has been updated, then the master copy can update the secondary copies 906b, 906c, 906d, or 906e via the secure connection. Thus, the main hardened facility for that application controls all updates to the system for that application, thereby avoiding the need to use a two-phase commit scheme where all of the nodes in a distributed system must agree to commit a transaction before the transaction can be completed or otherwise the transaction is aborted. The distributed networked system 900 thus provides a system where multiple copies of data are provided at disparate locations in a synchronized and highly accessible (low latency) manner, while retaining the security of the system.

When the clients need the actual data, the clients simply access the replacement value from the replacement values storage located at the clients' facilities and send the replacement value with a request to one of the hardened facilities 902a, 902b, 902c, 902d, or 902e, where the requestor is authenticated. The replacement value is then used to look up the actual data value in the respective encrypted values storage 906a, 906b, 906c, 906d, or 906e, the retrieved encrypted value is decrypted, and then sent back via a secure connection to the requestor.

Figure 10A:
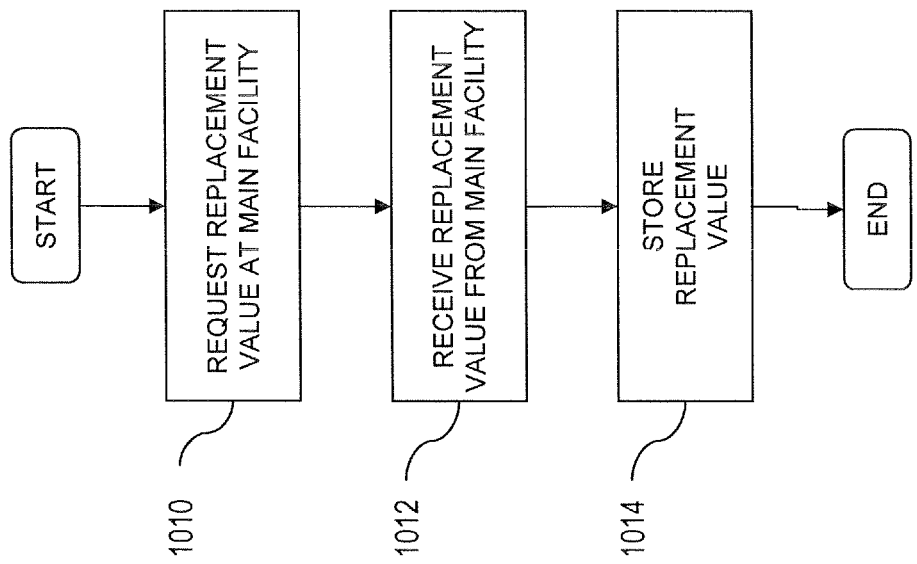

FIG. 10a is a flowchart depicting exemplary steps that may be performed by an exemplary client 910a, 910b, 910c, 910d, or 910e requesting a replacement value from an exemplary central encryption service 904a in accordance with an exemplary embodiment. FIG. 10b is a flowchart depicting exemplary steps that may be performed by an exemplary central encryption service 904a providing a replacement value to the exemplary client in accordance with an exemplary embodiment.

In Step 1010, client 910a can make a direct request to the central encryption service 904a, while clients 910b, 910c, 910d, and 910e, can make a request to their respective local secondary hardened facility 902b, 902c, 902d, and 902e, respectively, which will then forward the request to the main hardened facility 902a for that application for processing. Thus, the client generates a store secure field request, which is received by a client process store secure field, and the client process store secure field sends a request with a plain text format of the data for secure transport via a secure transport, which may transport the information via, for example, a SSL transport to the respective hardened facility. The main hardened facility 902a for the application ultimately receives the request in Step 1020, and then authenticates the requestor, if necessary. If the requestor is not authenticated, the main hardened facility 902a may respond to the request with an "access denied" response.

If the requestor is authenticated, then the central encryption service 904a receives the plain text data to process it via a store secure field process. A replacement value for the plain text data is received from a generate replacement key for secure field process, in Step 1022. The plain text data is encrypted in Step 1024, and the encrypted actual value and the replacement value are stored in the master copy database 906a in Step 1026. The secondary copy databases 906b, 906c, 906d, and 906e can then be updated to include the newly added data stored in the master copy database 906a in Step 1028. The replacement value is then sent via secure transport to the client in Step 1030. Thus, the client receives the replacement value in Step 1012, and stores the replacement value in a client application storage in Step 1014. The replacement value stored by the client may then be used to request the actual data value when needed.

Figure 11A:
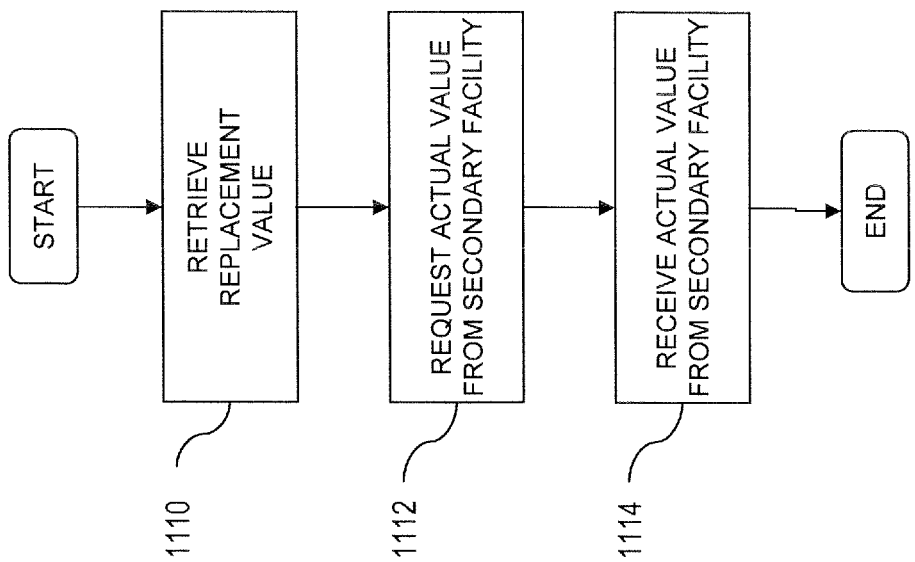
FIGS. 11a and 11b are flowcharts of, respectively, a process for requesting an actual value from a secondary decryption and distribution service, and a process for generating the actual value, in accordance with an exemplary embodiment.
Figure 11B:
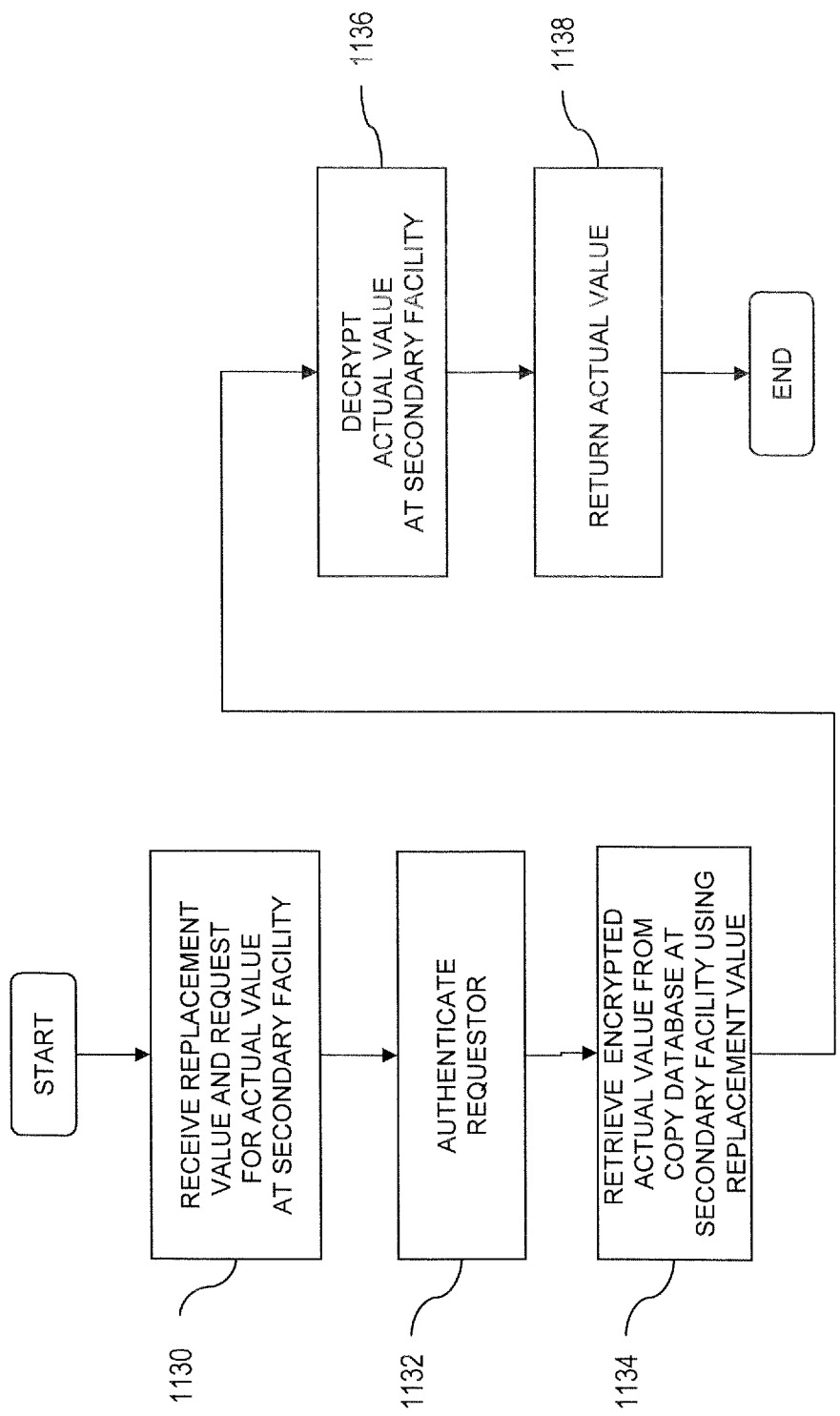

FIG. 11a is a flowchart depicting exemplary steps that may be performed by an exemplary client requesting an actual value from an exemplary secondary decryption and distribution service in accordance with an exemplary embodiment. FIG. 11b is a flowchart depicting exemplary steps that may be performed by an exemplary secondary decryption and distribution service providing an actual value to an exemplary client in accordance with an exemplary embodiment. It is noted that when a retrieval request is sent to the central encryption/decryption service 904a (e.g., by client 910a), the same processing is performed as depicted in FIGS. 5a and 5b, as thus is not further described here.

In Step 1110, a client (e.g., clients 910b, 910c, 910d, or 910e) retrieves the replacement value from the client application storage, and then in Step 1112 requests access to a securely stored actual data value by sending the replacement value to a respective secondary hardened facility (e.g., secondary hardened facilities 902b, 902c, 902d, or 902e) via a secure connection. The secondary hardened facility receives the request and the replacement value in Step 1130, and then authenticates the requestor in Step 1132. If the requestor is not authenticated, the secondary hardened facility may respond to the request with an "access denied" response.

If the requestor is authenticated, then the respective decryption service (e.g. decryption services 904b, 904c, 904d, or 904e) receives the replacement value and retrieves the corresponding encrypted actual value from the secure field storage in Step 1134. The encrypted actual value is then decrypted in Step 1136, and the decrypted actual value is sent via secure connection to the requestor in Step 1138. The requestor/client receives the actual value in Step 1114 for use.

Figure 12:
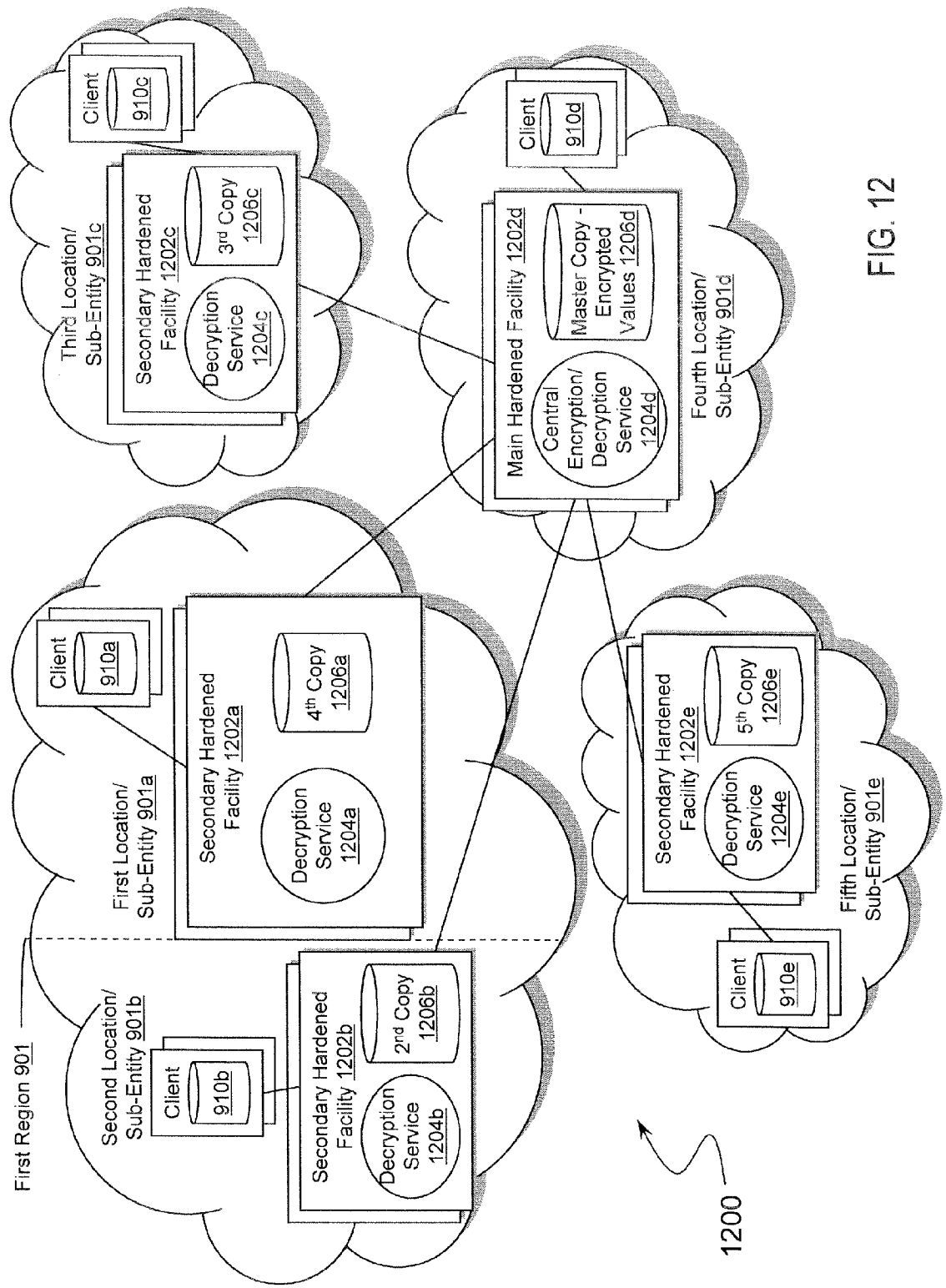
FIG. 12 depicts the distributed networked system of FIG. 9 for a second application with an alternative central encryption service and multiple secondary decryption and distribution services according to an exemplary embodiment.

FIG. 12 depicts the distributed networked system of FIG. 9 for a second application with an alternative central encryption service and multiple secondary decryption and distribution services according to an exemplary embodiment. In the distributed networked system 1200 shown in FIG. 12, a different location/sub-entity houses a hardened facility that is used as the main hardened facility for storing the master copy database for another application. Thus, for each particular application used in the networked system, a particular hardened facility can act as the main hardened facility for that particular application, thereby allowing the distribution of main hardened facilities for different applications to different locations/sub-entities if needed or advantageous to distribute the computing load and/or make the system more efficient.

In the particular embodiment depicted in FIG. 12, the fourth location/sub-entity 901d houses a hardened facility that acts as the main hardened facility 1202d for this particular application, which includes the central encryption/decryption service 1204d and master copy 1206d. The hardened facility at the first location/sub-entity 901a acts as a secondary hardened facility 1202a for this application, and includes a decryption service 1204a and secondary copy 1206a. The other locations/sub-entities 901b, 901c, and 901e process data in the same manner as in FIG. 9, and include secondary hardened facilities 1202b, 1202c, and 1202e, respectively, which include decryption services 1204b, 1204c, and 1204e, respectively, and secondary copies 1206b, 1206c, and 1206e, respectively. Each of the secondary hardened facilities 1202a, 1202b, 1202c, and 1202e are connected to the main hardened facility 1202d for this application via a secure connection (e.g., SSL). Both the configuration for the application shown in FIG. 9 and the configuration for the application shown in FIG. 12 can operate at the same time, and other layers of applications can be provided as needed.

Thus, the embodiment of FIGS. 9-13 processes storage requests and manages the updating of secondary storage databases using one facility, while allowing for the processing of inquiries (i.e. requests for data retrieval) at all facilities. Such a system configuration is particularly useful for applications that process a low volume of storage requests and a high volume of retrieval requests, such as for a credit card management application where the initial set-up information is typically stored once, and the information is accessed or retrieved numerous times during various transactions.

Figure 13:
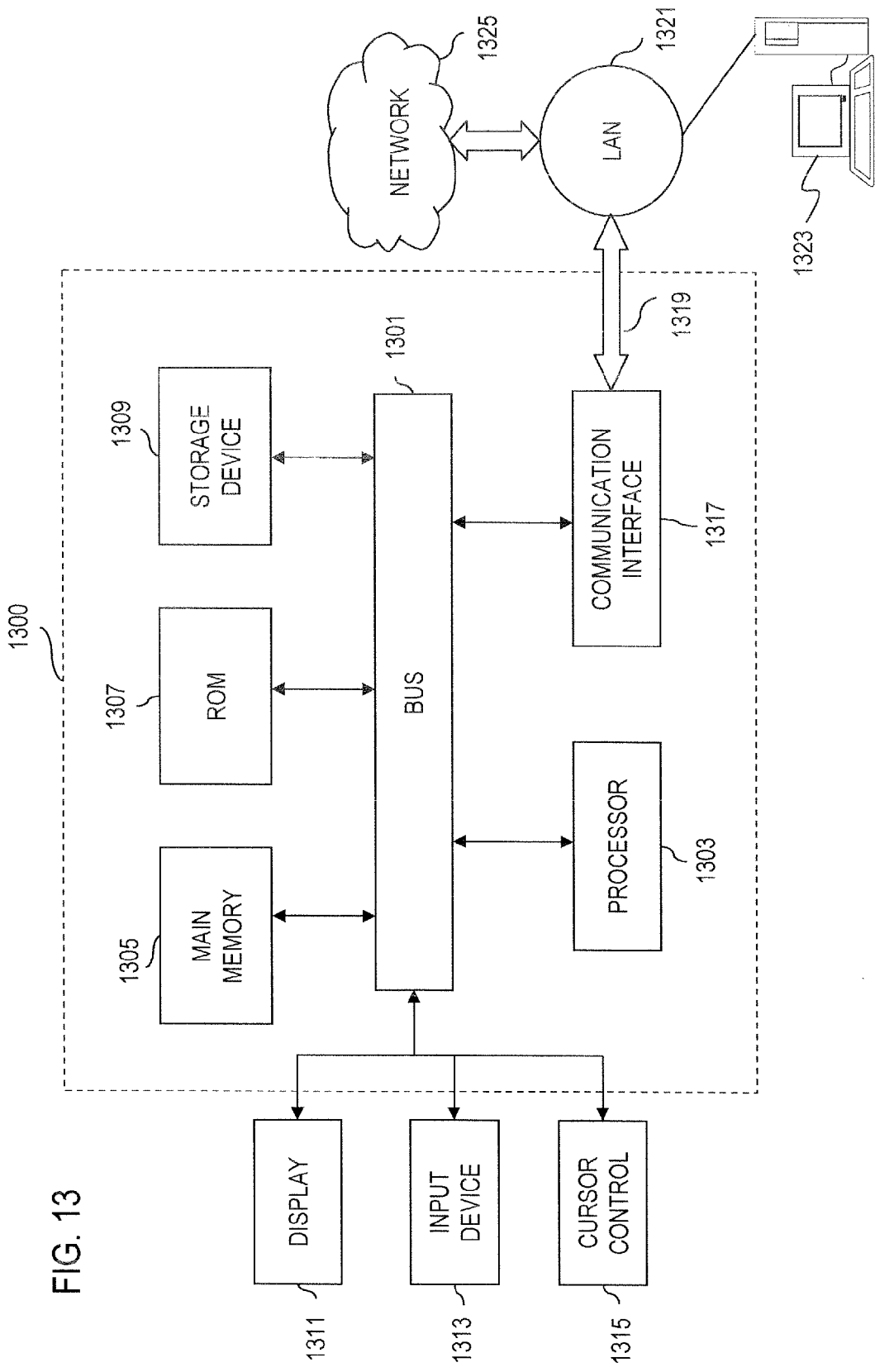
FIG. 13 depicts a computer system that can be used to implement an exemplary embodiment.

FIG. 13 illustrates a computer system 1300 upon which an embodiment according to the present invention can be implemented. The computer system 1300 includes a bus 1301 or other communication mechanism for communicating information and a processor 1303 coupled to the bus 1301 for processing information. The computer system 1300 also includes main memory 1305, such as a random access memory (RAM) or other dynamic storage device, coupled to the bus 1301 for storing information and instructions to be executed by the processor 1303. Main memory 1305 can also be used for storing temporary variables or other intermediate information during execution of instructions by the processor 1303. The computer system 1300 may further include a read only memory (ROM) 1307 or other static storage device coupled to the bus 1301 for storing static information and instructions for the processor 1303. A storage device 1309, such as a magnetic disk or optical disk, is coupled to the bus 1301 for persistently storing information and instructions.

The computer system 1300 may be coupled via the bus 1301 to a display 1311, such as a cathode ray tube (CRT), liquid crystal display, active matrix display, or plasma display, for displaying information to a computer user. An input device 1313, such as a keyboard including alphanumeric and other keys, is coupled to the bus 1301 for communicating information and command selections to the processor 1303. Another type of user input device is a cursor control 1315, such as a mouse, a trackball, or cursor direction keys, for communicating direction information and command selections to the processor 1303 and for controlling cursor movement on the display 1311.

According to one embodiment of the invention, central encryption and storage of sensitive data values is provided by the computer system 1300 in response to the processor 1303 executing an arrangement of instructions contained in main memory 1305. Such instructions can be read into main memory 1305 from another computer-readable medium, such as the storage device 1309. Execution of the arrangement of instructions contained in main memory 1305 causes the processor 1303 to perform the process steps described herein. One or more processors in a multi-processing arrangement may also be employed to execute the instructions contained in main memory 1305. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time typically by programming memory look up tables. Thus, embodiments of the present invention are not limited to any specific combination of hardware circuitry and/or software.

The computer system 1300 also includes a communication interface 1317 coupled to bus 1301. The communication interface 1317 provides a two-way data communication coupling to a network link 1319 connected to a local network 1321. For example, the communication interface 1317 may be a digital subscriber line (DSL) card or modem, an integrated services digital network (ISDN) card, a cable modem, a telephone modem, or any other communication interface to provide a data communication connection to a corresponding type of communication line. As another example, communication interface 1317 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1317 sends and receives electrical, electromagnetic, or optical signals that carry digital data streams representing various types of information. Further, the communication interface 1317 can include peripheral interface devices, such as a Universal Serial Bus (USB) interface, a PCMCIA (Personal Computer Memory Card International Association) interface, etc. Although a single communication interface 1317 is depicted in FIG. 13, multiple communication interfaces can also be employed.

The network link 1319 typically provides data communication through one or more networks to other data devices. For example, the network link 1319 may provide a connection through local network 1321 to a host computer 1323, which has connectivity to a network 1325 (e.g. a wide area network (WAN) or the global packet data communication network now commonly referred to as the "Internet") or to data equipment operated by a service provider. The local network 1321 and the network 1325 both use electrical, electromagnetic, or optical signals to convey information and instructions. The signals through the various networks and the signals on the network link 1319 and through the communication interface 1317, which communicate digital data with the computer system 1300, are exemplary forms of carrier waves bearing the information and instructions.

The computer system 1300 can send messages and receive data, including program code, through the network(s), the network link 1319, and the communication interface 1317. In the Internet example, a server (not shown) might transmit requested code belonging to an application program for implementing an exemplary embodiment through the network 1325, the local network 1321 and the communication interface 1317. The processor 1303 may execute the transmitted code while being received and/or store the code in the storage device 1309, or other non-volatile storage for later execution. In this manner, the computer system 1300 may obtain application code in the form of a carrier wave.

The term "computer-readable medium" as used herein refers to any medium that participates in providing instructions to the processor 1305 for execution. Such a medium may take many forms, including but not limited to non-volatile media, volatile media, and transmission media. Non-volatile media include, for example, optical or magnetic disks, such as the storage device 1309. Volatile media include dynamic memory, such as main memory 1305. Transmission media include coaxial cables, copper wire and fiber optics, including the wires that comprise the bus 1301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The following Appendix A includes a list of acronyms included herein, and is included for ease in reading.

APPENDIX A

AES Advanced Encryption Standard
API Application Program Interfaces
ATM Asynchronous Transfer Model
CD-ROM Compact Disk Read Only Memory
CDRW Compact Disk ReWriteable
CRT Cathode Ray Tube
DSL Digital Subscriber Line
DVD Digital Video Disk
EPROM Erasable Programmable Read Only Memory
CNo1 Card Number1
CNo2 Card Number2
ESSN Encrypted Social Security Number
FPGA Field Programmable Gate Arrays
IR Infrared
ISDN Integrated Services Digital Network
LAN Local Area Network
PCMCIA Personal Computer Memory Card International Association
PDA Personal Digital Assistant
PROM Programmable Read Only Memory
PT-SSN Plain Text Format Social Security Number
RAM Random Access Memory
R,E Data Pair: Replacement Data Value and Encrypted Data Value
RF Radio Frequency
ROM Read Only Memory
R-SSN Replacement Social Security Number
SSL Secure Sockets Layer
SSN Social Security Number
USB Universal Serial Bus
WAN Wide Area Network
XML Extensible Markup Language

What is claimed is:

1. A system for sensitive data management and storage for one or more applications comprising:
    a first facility; and
    a second facility configured to receive a data storage request directly from a requestor at a client device, said second facility being securely connected to said first facility to transfer the data storage request to said first facility,
    wherein the first facility and the second facility are computing systems communicating through a network,
    wherein said first facility includes:
        an authenticator configured to authenticate the requestor,
        a first central encryption device configured to receive a first actual data value from the requestor with the request, to obtain a first replacement value associated with the first actual data value, to encrypt the first actual data value, and to transmit the first replacement value to the requestor, and a first master storage device configured to store the encrypted first data value and the associated first replacement value, and wherein said second facility includes:

a second central encryption device configured to receive a second actual data value from a second requestor, to obtain a second replacement value associated with the second actual data value, to encrypt the second actual data value, and to transmit the second replacement value to the second requestor; and a second master storage device configured to store the encrypted second data value and the associated second replacement value, wherein data values stored at said first master storage device and said second master storage device are replicated to secondary storage devices at other facilities in the network, and wherein processing of replacement values respectively at said first facility and said second facility are enabled to operate at the same time.

2. The system according to claim 1, wherein said second facility includes a secondary storage device configured to store a copy of data stored in said first master storage device.

3. The system according to claim 2, wherein said second facility further includes:

a decryption device configured to receive a data retrieval request and the first replacement value from the requestor, to retrieve the encrypted first data value and associated first replacement value from said secondary storage device, to decrypt the encrypted first data value to obtain the first actual data value, and to transmit the first actual data value to the requestor; and an authenticator configured to authenticate the requestor.

4. The system according to claim 2, wherein data stored in said secondary storage device is updated when a new encrypted first data value and/or a new associated first replacement value is stored in said master storage device.

5. The system according to claim 1, wherein said first central encryption device and said first master storage device are configured to be used to receive and process data storage requests for a first application.

6. The system according to claim 5, wherein the second actual data value is related to a second application.

7. The system according to claim 6, wherein said first facility includes a secondary storage device configured to store a copy of data stored in said second master storage device of said second facility.

8. The system according to claim 7, wherein said first facility further includes:

a decryption device configured to receive a data retrieval request related to the second application and the second replacement value from the second requestor, to retrieve the encrypted second data value and the associated second replacement value from said secondary storage device of said first facility, to decrypt the encrypted second data value to obtain the second actual data value, and to transmit the second actual data value to the second requestor.

9. The system according to claim 7, wherein data stored in said secondary storage device of said first facility is updated when a new encrypted second data value and/or a new associated second replacement value is stored in said second master storage device of said second facility.

10. The system according to claim 6, wherein the second central encryption device of the second facility is an alternative central encryption service for the second application.

11. A system for sensitive data management and storage for one or more applications over a distributed network comprising:

a first facility including a first master storage device configured to store encrypted data values and associated replacement values based on authentication of a storage requestor; and a second facility configured to receive a data retrieval request directly from a requestor at a client device, said second facility includes a secondary storage device configured to store a copy of data stored in said first master storage device, wherein the first facility and the second facility are computing systems communicating through a network, wherein said second facility includes:

a decryption device configured to receive a first replacement value from the requestor with the data retrieval request, to retrieve an encrypted first data value associated with the first replacement value from said secondary storage device, to decrypt the encrypted first data value to obtain a first actual data value, and to transmit the first actual data value to the requestor, and wherein said first facility includes:

a decryption device configured to receive a second replacement value from the requestor with the data retrieval request, to retrieve an encrypted second data value associated with the second replacement value from said secondary storage device, to decrypt the encrypted second data value to obtain a second actual data value, and to transmit the second actual data value to the requestor, wherein data values stored at said first master storage device and a second master storage at the second facility device are replicated to other secondary storage devices at other facilities in the network, and wherein processing of replacement values respectively at said first facility and said second facility are enabled to operate at the same time.

12. A method of sensitive data management and storage for one or more applications over a distributed networked system comprising:

receiving, by a processor, a data storage request at a secondary facility for a first actual data value directly from a requestor at a client device;

forwarding the request and the first actual data value to a primary facility, wherein the primary facility and the secondary facility are computing systems communicating through a network;

authenticating the requestor;

obtaining a first replacement value associated with the first actual data value;

encrypting the first actual data value;

transmitting the first replacement value to the requestor;

storing the encrypted first data value and the associated first replacement value in a first master storage device at the primary facility;

transmitting the first replacement value to the requestor;

receiving another data storage request at the primary facility for a second actual data value directly from a second requestor at another client device;

forwarding the other request and the second actual data value to the secondary facility;

obtaining a second replacement value associated with the second actual data value;

encrypting the second actual data value; and storing the encrypted second data value and the associated second replacement value in a second master storage device at the secondary facility, wherein data values stored at the first master storage device and the second master storage device are replicated to secondary storage devices at other facilities in the network, and wherein processing of replacement values respectively at the primary facility and the secondary facility are enabled to operate at the same time.

13. The method according to claim 12, further comprising storing a copy of data stored in the first master storage device in a secondary storage device at the secondary facility.

14. The method according to claim 13, further comprising:

receiving a data retrieval request and the first replacement value from the requestor at the secondary facility;

retrieving the encrypted first data value and the associated first replacement value from the secondary storage device;

decrypting the encrypted first data value to obtain the first actual data value; and transmitting the first actual data value to the requestor.

15. The method according to claim 13, further comprising updating data stored in the secondary storage device when a new encrypted first data value and/or a new associated first replacement value is stored in the master storage device.

16. The method according to claim 12, wherein the data storage request is for data related to a first application.

17. The method according to claim 16, wherein the second actual data value is related to a second application from the second requestor.

18. The method according to claim 17, further comprising storing a copy of data stored in the second master storage device of the secondary facility in a secondary storage device at the primary facility.

19. The method according to claim 18, further comprising:

receiving a data retrieval request and the second replacement value related to the second application from the second requestor at the primary facility;

retrieving the encrypted second data value and the associated second replacement value from the secondary storage device at the primary facility;

decrypting the encrypted second data value to obtain the second actual data value; and transmitting the second actual data value to the second requestor.

20. The method according to claim 18, further comprising updating data stored in the secondary storage device of the primary facility when a new encrypted second data value and/or a new associated second replacement value is stored in the second master storage device of the secondary facility.

21. A method of sensitive data management and storage for one or more applications over a distributed networked system comprising:

storing, as caused by a processor, encrypted first data values and associated first replacement values in a first master storage device at a primary facility based on authentication of a storage requestor;

storing a copy of data stored in the first master storage device in a secondary storage device at a secondary facility, wherein the primary facility and the secondary facility are computing systems communicating through a network;

receiving a data retrieval request and a first replacement value at the secondary facility directly from a requestor at a client device;

retrieving an encrypted first data value associated with the first replacement value from the secondary storage device;

decrypting the encrypted first data value to obtain a first actual data value;

transmitting the first actual data value to the requestor;

storing, as caused by a processor, encrypted second data values and associated second replacement values in a second master storage device at a secondary facility based on authentication of another storage requestor;

storing a copy of data stored in the second master storage device in a primary storage device at the primary facility;

receiving another data retrieval request and second replacement value at the primary facility directly from the other requestor at another client device;

retrieving the second encrypted data value associated with the second replacement value from the primary storage device;

decrypting the second encrypted data value to obtain a second actual data value; and transmitting the second actual data value to the other requestor, wherein data values stored at the first master storage device and the second master storage device are replicated to other secondary storage devices at other facilities in the network, and wherein processing of replacement values respectively at the primary facility and the secondary facility are enabled to operate at the same time.

* * * * *